United States Patent [19]

Aylott

[11] 4,351,286
[45] Sep. 28, 1982

[54] COIL ASSEMBLY FOR AN IGNITION SYSTEM

[75] Inventor: John Aylott, Milton Keynes, England

[73] Assignee: WIPAC Development Limited, Buckingham, England

[21] Appl. No.: 189,407

[22] Filed: Sep. 22, 1980

[30] Foreign Application Priority Data

Oct. 4, 1979 [GB] United Kingdom ............... 7934440

[51] Int. Cl.³ ..................... F02P 3/06; F02D 3/06; F02P 3/08; F02P 1/00
[52] U.S. Cl. ................................. 123/601; 123/599; 123/602
[58] Field of Search ............... 123/601, 602, 618, 594, 123/599

[56] References Cited

U.S. PATENT DOCUMENTS

| 3,667,441 | 7/1972 | Cavil | 123/601 |
| 3,866,589 | 2/1975 | Haubner et al. | 123/602 |
| 4,036,201 | 7/1977 | Burson | 123/599 |
| 4,056,088 | 11/1977 | Carmichael | 123/599 |
| 4,074,669 | 2/1978 | Cavil et al. | 123/599 |
| 4,276,868 | 7/1981 | Burrows et al. | 123/602 |

Primary Examiner—Raymond A. Nelli
Attorney, Agent, or Firm—Blanchard, Flynn, Thiel, Boutell & Tanis

[57] ABSTRACT

In a capacitor discharge ignition system, the feed coil and trigger coil (T) are wound on a common former (26), the trigger coil (T) being located at a position along the supporting pole piece (16b) such as to give a desired degree of spark advance or retardation. Locating the trigger coil close to the engine flywheel (10) or to the base pole piece (16d) has surprisingly been found to give a degree of automatic spark advance or retardation respectively.

6 Claims, 4 Drawing Figures

COIL ASSEMBLY FOR AN IGNITION SYSTEM

FIELD OF THE INVENTION

This invention relates to a coil assembly for a magneto ignition system, preferably a capacitor-discharge ignition system, and to a method of making the same.

BACKGROUND OF THE INVENTION

There exists a need in an ignition system to provide a degree of spark advance. With a capacitor discharge ignition system of the type using a trigger coil this has been achieved by having two trigger coils and switching between them as the engine speed increases. This is complex and unsatisfactory.

BRIEF DESCRIPTION OF THE DRAWINGS

The present invention which is defined in the appended claims will be described by way of example with reference to the drawings, in which:

DETAILED DESCRIPTION

Figure 1:
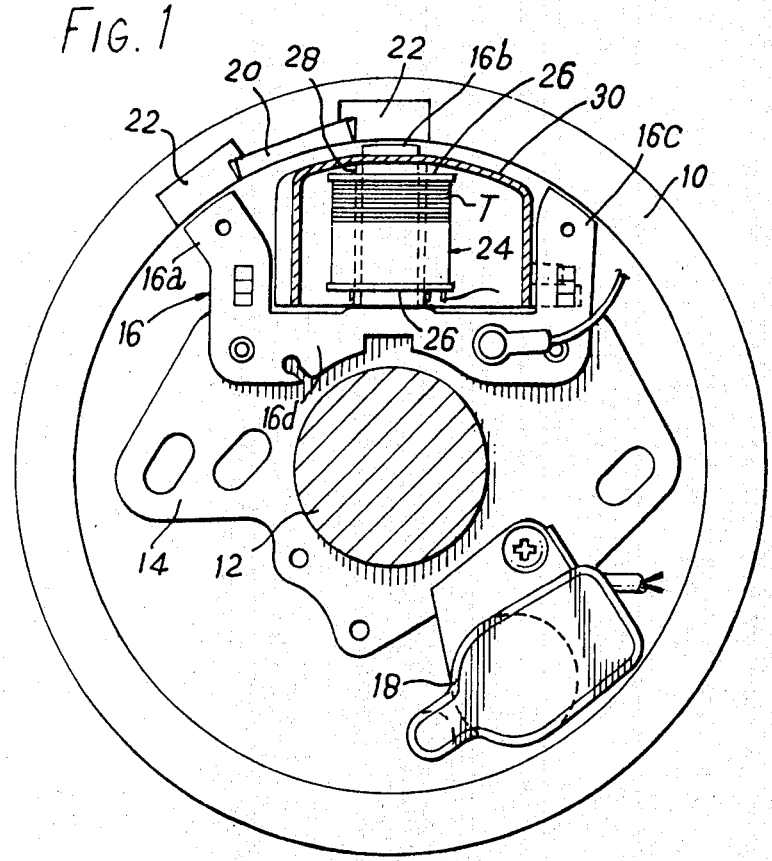
FIG. 1 shows a magneto coil assembly embodying the invention for use in a capacitor-discharge magneto ignition pulse generator.

FIG. 1 shows an engine flywheel 10 rotating about a fixed shaft 12. The engine may be a small two or four stroke petrol engine, e.g. of 5 to 6 horsepower, such as is used in marine outboard engines, lawnmowers, and pumps, and is preferably below 8 to 10 horsepower. Fixed to the shaft 12 is a mounting plate 14 which carries magnetic pole pieces 16 and a transformer unit 18.

The magnetic pole pieces 16 are in the general shape of a W, providing three poles 16a, 16b and 16c which extend radially from a base portion 16d to face the inner surface of the flywheel. The flywheel includes a permanent magnet 20 provided with two pole pieces 22 on its inner surface, the pole pieces 22 being spaced by the same distance as the central pole piece 16b is spaced from the outer pole pieces 16a and 16c.

Around the central pole piece 16b is a winding assembly 24. The winding assembly consists of two windings on a common former 26. The former 26 is a sliding fit over an internal hollow leg 28 of a coil housing 30, and the leg 28 is itself a sliding fit over the central pole piece 16b. The former 26 and housing 30 can be secured in position in any convenient manner, e.g. by adhesive.

Figure 3:
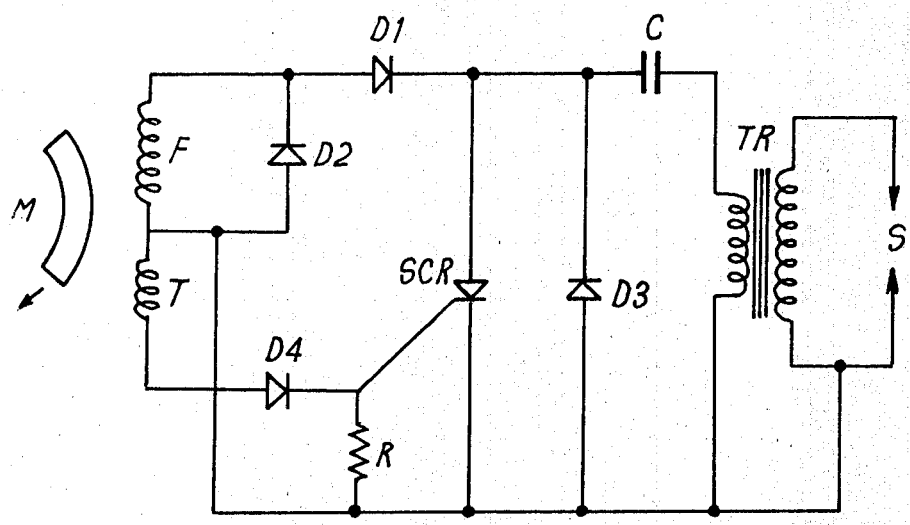
FIG. 3 is a circuit diagram of an ignition system incorporating the assembly of FIG. 1.

It is now convenient to refer to FIG. 3 which shows the circuit diagram of a capacitor discharge magneto ignition system of which the apparatus of FIG. 1 is part.

Referring to FIG. 3, the circuit includes a generator or feed coil F, and a trigger coil T wound as a continuation of the feed coil winding.

A diode D1 passes positive current pulses from the feed coil F to a reservoir capacitor C, so that the left-hand capacitor terminal, as seen in FIG. 3 becomes positively charged.

A semiconductor rectifier SCR is connected between the positive capacitor terminal and circuit ground, and the primary winding of an output transformer TR is connected between the negative capacitor terminal and ground, so that on conduction of the SCR the capacitor C discharges through the primary of the transformer TR.

A trigger circuit is provided for the SCR, consisting of the trigger winding T, and a diode D4 and a resistor R connected across the winding T. The junction between the diode D4 and resistor R is connected to the gate of the SCR.

Figure 4:
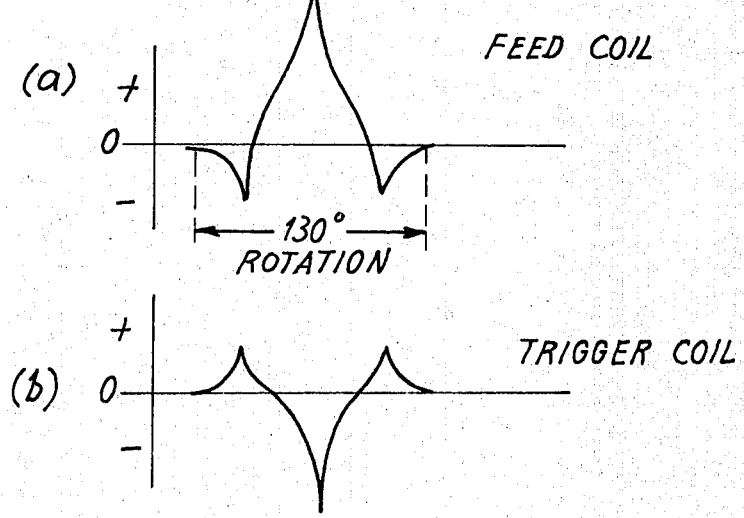
FIG. 4 shows waveforms arising in the circuit of FIG. 3.

As the magnet M passes the coils F and T, voltages are induced in these coils as shown in FIG. 4 at (a) and (b) respectively. The positive part of the waveform (a) charges the capacitor C through D1. The positive part of the waveform (b) provides two triggering pulses, the first of which is abortive as the capacitor is substantially discharged, and the second of which is an effective trigger pulse and triggers the SCR into conduction. This causes a substantial discharge current to flow through the primary of the output transformer TR, the secondary of which is connected to a spark gap S.

The capacitance of the capacitor C and inductance of the transformer TR are such that current tends to oscillate between the capacitor and transformer at a frequency of typically 20 kHz, forward current flowing through the SCR and reverse current flowing through the winding F. A further diode D3 is connected in anti-parallel across the SCR to facilitate this reverse conduction, and hence to prolong the duration of the oscillations, thus prolonging the spark duration.

The circuit illustrated also includes another diode D2 connected across the feed coil F so as to be conductive when the diode D1 is turned off. This loads and indeed short-circuits the winding F, so as to provide a measure of compensation for variations in the voltage induced in the feed coil. The diode D2 increasingly loads the coil with increasing voltage and has some effect during the half-cycles when diode D1 is conductive, presumably due to the reluctance of the coil circuit. When diode D3 is conducting current can also flow through diodes D2 and D1.

The circuit of FIG. 3 forms the subject of our British Patent Application No. 2033005 to which reference should be made for further details.

Figure 2:
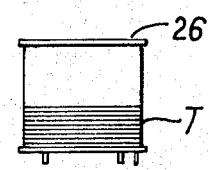
FIG. 2 illustrates an alternative coil construction.

Referring again to FIG. 1, the trigger winding T of FIG. 3 is wound on the same coil former 26 as is the feed coil F. More specifically, the feed coil F is wound first and the trigger coil T is wound on top of it. The trigger coil is much smaller than the feed coil, being typically 80 to 120 turns whereas the feed coil may be 2,500 to 4,000. The trigger coil T is shown in FIG. 1 as being wound at the end of the former 26 closest to the flywheel. The coil T is wound in two layers. It will be seen that there is room to wind it in any of a range of positions between that shown in FIG. 1 and the converse situation illustrated in FIG. 2 where the coil is at the opposite end of the former 26.

We have found that the choice of the radial position of the trigger coil T has surprising effects on the operation of the circuit. We have found that by positioning the coil close to the flywheel, as shown in FIG. 1, the circuit automatically provides a degree of spark advance; that is to say in one example as the engine speed increased from 400 rpm to 1000 rpm the sparking point advanced by 4 degrees. This degree of advance can not be accounted for solely by the fact that the trigger pulse increases in amplitude. Conversely, by positioning the trigger coil near the base portion 16d of the pole pieces 16, we have found that a degree of spark retardation is obtained. Somewhere between the two extreme positions there is a position where a static spark results.

The facility to provide for a desired degree of retard or, more usually, advance in this way is extremely valuable as it enables the ignition system to be given desired characteristics very simply. Furthermore, considerable economies result from being able to wind the trigger and feed coils on a common former. The ignition system can be designed so as to give reliable starting characteristics in the knowledge that automatic spark advance can be obtained to give proper spark timing when running at normal speed.

The output transformer TR is mounted in the transformer housing 18 to which a high tension lead can be connected. The rest of the circuit of FIG. 3 can be mounted on a small printed circuit board constituting one end of the coil former 26.

While the magneto coil assembly has been shown as being mounted on the inside of the flywheel, in an alternative arrangement it can be located against the outer surface or a side surface of the flywheel. The pole pieces have been shown as of W form but could be in other shapes, particularly in a U or C shape with only two legs.

The embodiments of the invention in which an exclusive property or privilege is claimed are defined as follows:

1. A method of advancing or retarding the spark for an internal combustion engine having a spark plug, a nonmagnetic first member supported for rotation about an axis, and a nonmagnetic second member supported adjacent said first member and fixed against rotation therewith, comprising the steps of:
   providing on said first member a pair of angularly spaced magnets of opposite polarity;
   providing on said second member a core having at least two legs extending approximately radially of said axis, the free ends of each said leg being located adjacent said first member;
   winding a charge coil around a said leg of said core;
   winding a trigger coil around a said leg of said core;
   electrically connecting a capacitive discharge circuit to said charge coil, said trigger coil and said spark plug;
   storing energy from said charge coil in said circuit and, in response to a periodic signal from said trigger coil, periodically discharging said stored energy to said spark plug to periodically produce a spark which is synchronized in time with the rotation of said first member; and
   selecting the position of said trigger coil on said associated core leg to provide a desired amount of angular advancement or retardation in the timing of said spark in response to an increase in the speed of said engine, the degree of change in said spark timing for a given increase in engine speed being proportional to the distance of said trigger coil from said first member, said spark timing being advanced when said trigger coil is positioned adjacent said first member and being retarded when said trigger coil is positioned remote from said first said member.

2. The method according to claim 1, wherein said step of winding said trigger coil includes winding said trigger coil concentrically around said charge coil, said charge coil having a substantially greater number of turns and a greater axial length than said trigger coil.

3. An ignition system for an internal combustion engine having a spark plug, a first member supported for rotation about an axis, and a second member supported adjacent and fixed against rotation with respect to said first member, comprising:
   a pair of magnets of opposite polarity supported on said first member at angularly spaced locations;
   a core supported on said second member and having at least two generally radially extending legs, the free ends of said legs being located adjacent said first member;
   a charge core wound around a said leg of said core;
   capacitive discharge circuit means cooperable with said spark plug and said charge coil for storing energy generated by said charge coil in response to rotational movement of said first member and said magnets thereon and for periodically discharging said stored energy to said spark plug to periodically produce a spark synchronized in time with the rotation of said first member; and
   trigger coil means concentrically wound around, having a lesser number of windings than, and having a lesser axial length than said charge coil and cooperable with said circuit means for initiating said periodic discharge of said stored energy to said spark plug and for effecting angular advancement or retardation of said spark timing at increased engine speeds, the degree of change in said spark timing for a given increase in engine speed being proportional to the distance of said trigger coil means from said first member, said spark timing being advanced when said trigger coil means is positioned adjacent said first member and being retarded when said trigger coil means is positioned remote from said first member.

4. The ignition system according to claim 3, wherein said core is substantially W-shaped, said charge coil and said trigger coil means being provided on the center leg thereof.

5. The ignition system according to claim 4, including a former encircling said central leg of said core, said charge coil and said trigger coil means being wound on said former, a housing surrounding said charge coil and trigger coil means, and an internal hollow leg provided on said housing which surrounds said central leg of said core within said former.

6. The ignition system according to claim 3, wherein said circuit means includes a transformer having primary and secondary windings, said secondary winding being connected across said spark plug, a capacitor connected in series with said primary winding, a first diode connected in parallel across said capacitor and said primary winding, an SCR connected across said first diode with opposite polarity thereto and having a gate, second and third diodes connected in parallel across and having the same polarity as said first diode, the anode of said third diode being connected to the anode of said first diode and said charge coil being connected in parallel with said third diode, and a fourth diode and a resistor connected in series across said trigger coil means, the cathode of said fourth diode being connected to said resistor and to said gate of said SCR.

* * * * *

UNITED STATES PATENT AND TRADEMARK OFFICE
CERTIFICATE OF CORRECTION

PATENT NO. : 4 351 286
DATED : September 28, 1982
INVENTOR(S) : John Aylott

It is certified that error appears in the above—identified patent and that said Letters Patent is hereby corrected as shown below:

Col. 3, line 38; change "ends" to ---end---.

Col. 4, line 14; change "charge core" to ---charge coil---.

Col. 4, line 47; change "central" to ---center---.

Col. 4, lines 57 and 58; change "parallel across" to ---series with each other, and the combination of said second and third diodes being connected in parallel with---.

Col. 4, line 62; change "across" to ---with each other, said fourth diode and resistor being connected in parallel with---.

Signed and Sealed this

Eighteenth Day of January 1983

[SEAL]

Attest:

Attesting Officer

GERALD J. MOSSINGHOFF

Commissioner of Patents and Trademarks